United States Patent [19]

Terazawa

[11] Patent Number: 5,444,578
[45] Date of Patent: Aug. 22, 1995

[54] MAGNETIC REPRODUCTION CIRCUIT HAVING VARIABLE AMPLIFICATION FOR CORRECTION

[75] Inventor: Takeshi Terazawa, Amagasaki, Japan
[73] Assignee: Mitsubishi Denki Kabushiki Kaisha, Tokyo, Japan
[21] Appl. No.: 166,062
[22] Filed: Dec. 14, 1993
[30] Foreign Application Priority Data
Dec. 28, 1992 [JP] Japan .................. 4-348436
[51] Int. Cl.$^6$ .............................................. G11B 5/035
[52] U.S. Cl. ..................................................... 360/65
[58] Field of Search ............... 360/46, 69, 67; 375/13, 375/14, 11, 111, 114; 333/28 R

[56] References Cited

U.S. PATENT DOCUMENTS

| | | | |
|---|---|---|---|
| 4,635,143 | 1/1987 | Suzuki et al. | 360/65 |
| 4,908,722 | 3/1990 | Sonobe | 360/46 |
| 5,077,623 | 12/1990 | McSweeney | 360/65 X |
| 5,124,850 | 6/1992 | Yuzu | 360/65 X |
| 5,307,213 | 4/1994 | Nishiyama | 360/65 X |

OTHER PUBLICATIONS

B. J. Langland, "Phase Equalization for Perpendicular Recording", *IEEE Transactions on Magnetics,* vol. MAG-18, No. 6, Nov. 1982, pp. 1247–1249.
B. J. Langland et al., "Processing of Signals from Media with Perpendicular Magnetic Anisotropy", *IEEE Transactions on Magnetics,* vol. MAG-16, No. 5, Sep. 1980, pp. 640–642.

*Primary Examiner*—Donald Hajec
*Assistant Examiner*—Le, Thien Minh
*Attorney, Agent, or Firm*—Burns, Doane, Swecker & Mathis

[57] ABSTRACT

A magnetic reproduction circuit is which includes: a Hilbert transform filter and a delay element each adapted to receive a signal reproduced from a magnetic recording medium; a variable amplifier connected to an output terminal of at least one of the Hilbert transform filter and the delay element; an adder for adding outputs of the Hilbert transform filter and the delay element wherein the outputs are fed to the adder with or without passing through the variable amplifier for varing their amplitudes; a detector for detecting a magnetic transition point of the magnetic recording medium; and a magnetization ratio detector for finding a ratio of a magnetization of the magnetic recording medium in the moving direction to a magnetization of the magnetic recording medium in a direction perpendicular the to moving direction, wherein an amplification factor of the variable amplifier is varied using the magnetization ratio found by the magnetization detector as a parameter.

11 Claims, 7 Drawing Sheets

(I)   (II)

MAGNETIC REPRODUCTION CIRCUIT HAVING VARIABLE AMPLIFICATION FOR CORRECTION

BACKGROUND OF THE INVENTION

The present invention relates to reproduction circuits for use in magnetic recording/reproduction systems.

Hitherto, there has been known a magnetic reproduction circuit employing a Hilbert transform filter and a delay element, which circuit corrects reproduction signals read out of a magnetic recording medium having a magnetization component in its moving direction and a magnetization component perpendicular to the moving direction. Magnetic reproduction circuits of such type have been disclosed in, for example, Japanese Unexamined Patent Publication No. 231404/1987 and B. J. Langland "Phase Equalization for Perpendicular Recording", IEEE Trans. on Magn., Vol. MAC-18, pp. 1247–1249, 1982 (hereinafter referred to as "literature reference 1").

FIG. 8 is a block diagram showing the configuration of a reproduction circuit of this type, which comprises an input terminal 1 for reproduction signals fed from a magnetic head (not shown), a Hilbert transform filter 2, a delay element 3, an amplifier 4 of which amplification factor is $-\tan\alpha$, an adder 5, an amplifier 6 of which amplification factor is $\cos\alpha$, and an output terminal 7.

The operation of the reproduction circuit is to be explained. In this explanation there is used a reproduction waveform model given by the reciprocity theorem using a Karlqvist model as a magnetic field of a magnetic head and an arctangent function model as residual magnetization of a medium, as described in Robert I. Potter, "Analysis of Saturation Magnetic Recording Based on Arctangent Magnetization Transitions", J. Appl. Phys., Vol. 41, pp. 1647–1651, 1970 (hereinafter referred to as "Literature reference 2"). In this model a parameter $\theta$ is used, the ratio of a component in the medium-moving direction (hereinafter referred to as "longitudinal component") to a component perpendicular to the medium-moving direction (hereinafter referred to as "perpendicular component") is represented as $\cos\theta : \sin\theta$.

Here, a reproduction signal $e_o(x)$ applied to the input terminal is represented by the equation (1):

$$e_o(x) = e_x(x)\cdot\cos\theta + e_y(x)\cdot\sin\theta \tag{1}$$

wherein $a$ is magnetic transition width, $d$ is pacing $g$ is gap length and $x$ is a variable distance from a point of magnetic transition. That is, the reproduction signal $e_o(x)$ represented by the equation (1) is the sum of the product of a longitudinal reproduction waveform $e_x(x)$ per unit magnetization by $\cos\theta$ and the product of a perpendicular reproduction waveform $e_y(x)$ per unit magnetization by $\sin\theta$. The waveforms $e_x(x)$ and $e_y(x)$, respectively, are represented by the equations (2) and (3):

$$e_x(x) = E_0 \cdot \left\{ \tan^{-1}\frac{x+g/2}{a+d} - \tan^{-1}\frac{x-g/2}{a+d} \right\} \tag{2}$$

$$e_y(x) = \frac{E_0}{2} \cdot \ln\frac{(x+g/2)^2 + (a+d)^2}{(x-g/2)^2 + (a+d)^2} \tag{3}$$

FIGS. 7(a) to 7(c) are time charts showing a waveform of the reproduction signal $e_o(x)$, that of the longitudinal component $e_x(x)$, and that of the perpendicular component $e_y(x)$, respectively. As apparent from these figures, the longitudinal component $e_x(x)$ is even functional, while the perpendicular component $e_y(x)$ is odd functional. Consequently, the reproduction signal $e_o(x)$, or the sum of these components, is asymmetrical. The longitudinal component $e_x(x)$ and the perpendicular component $e_y(x)$ can be transformed to each other by Hilbert transform and the relationship therebetween is represented by the equations (4) and (5):

$$\int_{-\infty}^{\infty} \frac{e_x(x-u)}{\pi u} du = e_y(x) \tag{4}$$

$$\int_{-\infty}^{\infty} \frac{e_y(x-u)}{\pi u} du = -e_x(x) \tag{5}$$

Therefore, an output $e_h(x)$ as a result of the Hilbert transform of the reproduction signal $e_o(x)$ is represented by the equation (6):

$$e_h(x) = -e_x(x)\cdot\sin\theta + e_y(x)\cdot\cos\theta \tag{6}$$

As shown in FIG. 8, the parameter of the amplifiers 4 and 6 being set to $\alpha = \theta$, this transformed output signal $e_h(x)$ is amplified by the amplifier 4 to give a signal, $-\tan\theta\cdot e_h(x)$, to which is then added by the adder 5 the reproduction signal $e_o(x)$ compensated by the delay element 3 for its delay produced by the Hibert transform filter 2 and amplifier 4, followed by amplification of the sum by the amplifier 6. This gives the output terminal a signal $e_c(x)$ resulting from the transformation of the signal into a waveform equivalent to the even functional waveform shown in FIG. 7(b) of the longitudinal component $e_x(x)$. The signal $e_o(x)$ is represented by the equation (7):

$$e_c(x) = \{e_o(x) - \tan\theta\cdot e_h(x)\}\cos\theta = e_x(x) \tag{7}$$

Thus, the transformation of the signal into a even functional waveform makes it possible to simplify the reproduction signal processing.

In the above-mentioned conventional magnetic reproduction circuit using Hilbert transform filter, it is required to strictly control or establish the magnetic characteristics of the medium, recording/reproduction conditions of the system and the like so that the ratio of the longitudinal component to the perpendicular component is set within a range predetermined by a design value of the magnetic reproduction circuit. Stated otherwise, as the ratio departs from the range, a problem arises that the waveform cannot be corrected as required with remaining asymmetry. Further, if the reproduction circuit is used in a system employing a removable medium, the allowable design values for the reproduction circuit and succeeding circuits are required to increase correspondingly to variation in magnetic characteristics of media, which results in insufficient performance of the head and medium.

It is, therefore, an object of the present invention to overcome the foregoing problems and to provide a magnetic reproduction circuit with a circuit for calculating the ratio of a longitudinal component to a perpendicular component and an amplifier of which amplification factor is variable corresponding to the ratio, the reproduction circuit being capable of obtaining a reproduction signal $e_c(x)$ resulting from the transformation of a signal into a waveform equivalent to a even functional waveform of the longitudinal component $e_x(x)$ even when there is a variation in the magnetic characteristics of a magnetic medium, the intensity or distribution of a magnetic field of a head, or the like.

SUMMARY OF THE INVENTION

According to the present invention, there is provided a magnetic reproduction circuit, comprising:

a Hilbert transform filter and a delay element each adapted to receive a signal reproduced from a magnetic recording medium;

a variable amplifier connected to an output terminal of at least one of the Hilbert transform filter and the delay element;

an adder for adding outputs from the Hilbert transform filter and the delay element, wherein the outputs are fed to the adder with or without passing through the variable amplifier for varying their amplitudes, a detector for detecting a magnetic transition S point of the magnetic recording medium, and a magnetization ratio detector for finding a ratio of a magnetization of the magnetic recording medium in the moving direction to a magnetization of the magnetic in recording medium a direction perpendicular to the moving direction, wherein an amplification factor of the variable amplifier is varied by using the magnetization ratio found by the magnetization detector as a parameter.

A magnetic transition point detector according to the present invention comprises two square multipliers respectively to be connected to output terminals of a Hilbert transform filter and a delay element and an adder connected to the output terminals of the two square multipliers.

A magnetization ratio detector according to the present invention comprises an arithmetic circuit for finding a ratio of spectra perpendicular to each other of a reproduction signal existing in any interval with the magnetic transition point as its center, found by the aforesaid magnetic transition point detector, and an arctangent arithmetic circuit for finding an arctangent value of the ratio.

Another embodiment of the magnetization ratio detector according to the present invention comprises a waveform inverse arithmetic circuit for inverting a reproduction signal with respect to a magnetic transition point, an adder for finding a sum of the reproduction signal inverted and the original reproduction signal, a subtracter for finding a difference between the reproduction signal inverted and the original reproduction signal, square multipliers respectively connected to output terminals of the adder and the subtracter, integrators respectively connected to output terminals of the two square multipliers, square root calculators respectively connected to output terminals of the two integrators, a divider for finding an output ratio of one of the two square root calculators to the other, and an arctangent calculator for finding an arctangent value of the ratio found by the divider.

In the reproduction circuit thus configured, even if there is an input of an asymmetrical waveform signal having an unknown ratio of its longitudinal component to its perpendicular component, the magnetization component ratio of the longitudinal component to the perpendicular component is found and the amplification factor of the amplifier is varied in accordance as the ratio. Hence, there can be automatically obtained a waveform equivalent to a even functional waveform signal reproduced only from the longitudinal component.

DETAILED DESCRIPTION

Figure 1:
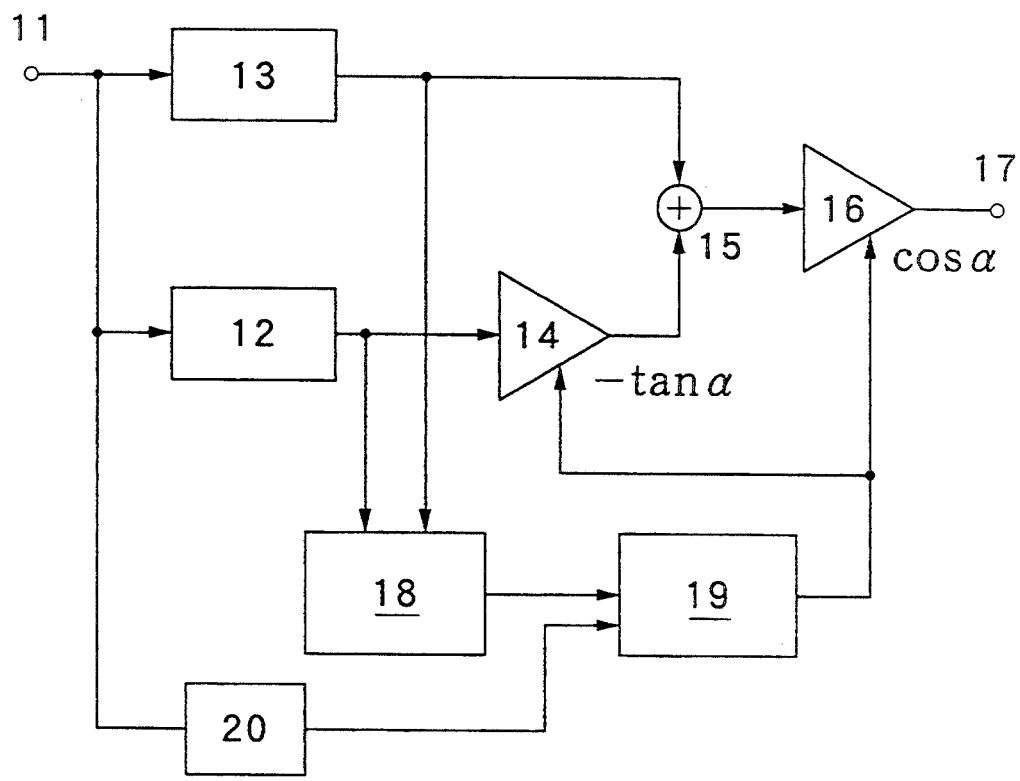
FIG. 1 is a block diagram showing one embodiment of a magnetic reproduction circuit according to the present invention.

The present invention will now be described in detail by way of embodiments thereof shown in the drawings.

Embodiment 1

FIG. 1 shows the configuration of one embodiment of a magnetic reproduction circuit according to the present invention comprising a reproduction signal input terminal 11, a Hilbert transform filter 12, a delay element 13 of the same delay time with the Hilbert transform filter 12, a variable amplifier 14 having an amplification factor of $-\tan\alpha$, an adder 15, a variable amplifier 16 having an amplification factor of $\cos\alpha$, a signal output terminal 17, a magnetic transition point detector 18, a magnetization ratio detector 19, and a delay element 20.

Figure 8:
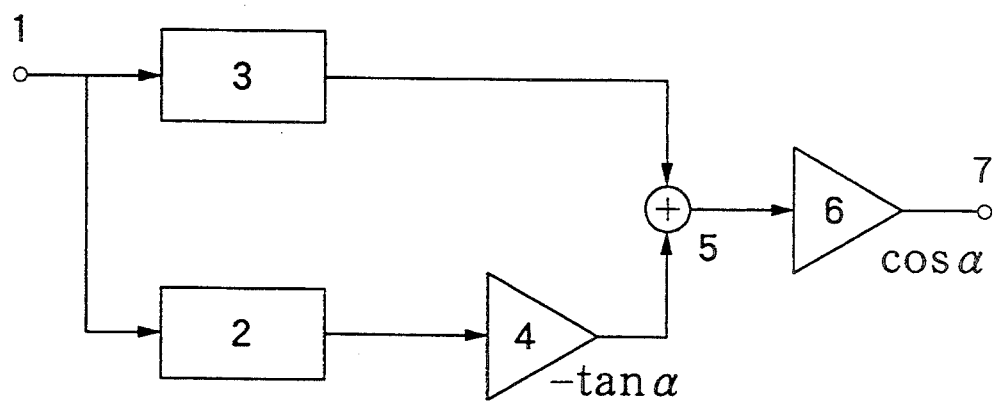
FIG. 8 is a block diagram showing the configuration of a conventional magnetic reproduction circuit.

The operation of the reproduction circuit is to be described using a reproduction waveform model similar to that used to describe the foregoing conventional reproduction circuit. In this reproduction circuit is newly added to the conventional reproduction circuit shown in FIG. 8 an arithmetic circuit for finding an arctangent value $\theta$ of the ratio of the longitudinal component to perpendicular component of a medium, and the respective amplification factors $-\tan\alpha$ and $\cos\alpha$ of the variable amplifiers 14 and 16 are set so that $\alpha$ is equal to $\theta$ as in the equation (7). Thus, the reproduction circuit can obtain a symmetrical reproduction signal equivalent to the longitudinal component.

From the equations (1) and (6) a reproduction waveform and its Hilbert-transformed waveform can be transformed into each other by unitary matrix. Therefore, the sum of the square number of the reproduction waveform and that of its Hilbert-transformed waveform is a symmetrical function with its center of a magnetic transition point, regardless of the ratio of the longitudinal component to perpendicular component of the medium, or the degree of asymmetry. Further, from the equations (2) and (3), the longitudinal component and the perpendicular component become an even function and an odd function, respectively, both having the center of the magnetic transition point. Therefore, they can be separated from each other by Fourier expansion or the like.

In this embodiment, utilizing these relationships, an arithmetic circuit for finding functions symmetrical with respect to the magnetic transition point is provided as the magnetic transition point detector 18, and an arithmetic circuit for finding even function component and odd function component of a reproduction signal with respect to the magnetic transition point is provided as the magnetization ratio detector 19 which finds the value of $\theta$.

Thus, even when a signal is reproduced from a medium having an unknown magnetization ratio or a variable magnetization ratio, there can be automatically obtained a waveform equivalent to a symmetrical signal reproduced only from the longitudinal component by calculating the magnetization component ratio and varying the amplification factor of the amplifier in accordance with that ratio.

If the magnetic transition point detector 18 is formed of a digital arithmetic circuit or the like, it outputs a waveform with a delay for the arithmetic operation with respect to the real reproduction waveform. The magnetic transition detection signal and the real reproduction signal need to be equalized to each other in phase at the input of the magnetization ratio detector. To this end, the delay element 20 is provided for compensating for such a delay.

Embodiment 2

To be described next is one embodiment of a magnetic transition point detector section of the magnetic reproduction circuit according to the present invention.

Figure 2:
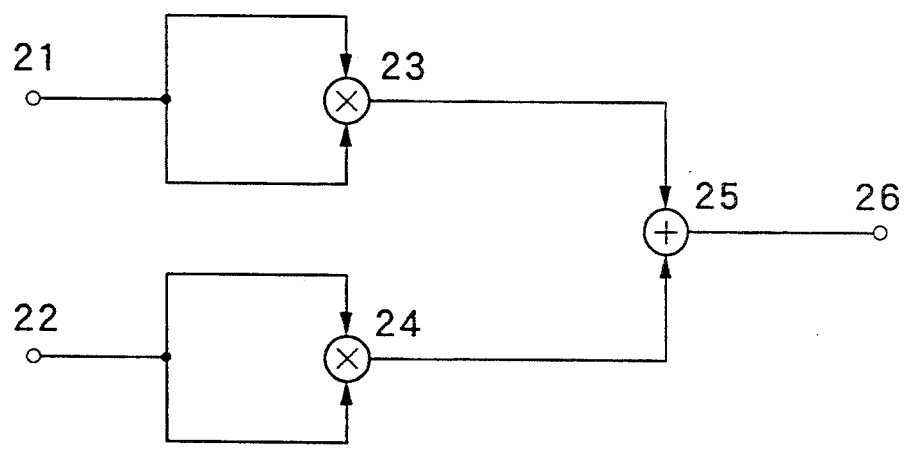
FIG. 2 is a block diagram showing one embodiment of a magnetic transition point detector for use in the magnetic reproduction circuit of the present invention.

FIG. 2 is a block diagram showing one embodiment of a magnetic transition point detector section including a terminal 21 to which an output of the delay element 13 shown in FIG. 1 is input, a terminal 22 to which an output of the variable amplifier 14 shown in FIG. 1 is input, square multipliers 23 and 24, and an output terminal 26.

The operation of the magnetic transition point detector section is to be described by using a reproduction waveform model similar to that used to describe the conventional magnetic reproduction circuit. This embodiment also utilizes the relation between the equations (1) and (6) which are transformable to each other by unitary matrix.

Functions $\psi(x)$ and $\xi(x)$ respectively represented by equations (8) and (9):

$$\psi(x) = (e_x(x))^2 + (e_y(x))^2 \quad (8)$$

$$\xi(x) = (e_o(x))^2 + (e_h(x))^2 \quad (9)$$

have a relationship represent by the equation (10):

$$\psi(x) = \xi(x) \quad (10)$$

The equations (2) and (3) lead the following equations (11) and (12):

$$e_x(-x) = e_x(x) \quad (11)$$

$$e_y(-x) = -e_y(x) \quad (12)$$

Thus, $\xi$ (x) becomes an even function and, at the same time, a symmetrical function with respect to a magnetic transition point. From the equation (10), $\psi$ (x) is equal to $\xi$ (x) and becomes a symmetrical function about the magnetic transition point. Therefore, finding $\psi$ (x) according to the block diagram at FIG. 2 makes it possible to obtain information of the magnetic transition point. Note that the output $\psi$ (x) of the block is independent of the ratio of the longitudinal component to the perpendicular component.

The magnetic transition point thus detected by the above arithmetic is fed to the magnetization ratio detector 19 to find the magnetization ratio of the longitudinal component to the perpendicular component thereby giving a parameter $\theta$.

Embodiment 3

Figure 3:
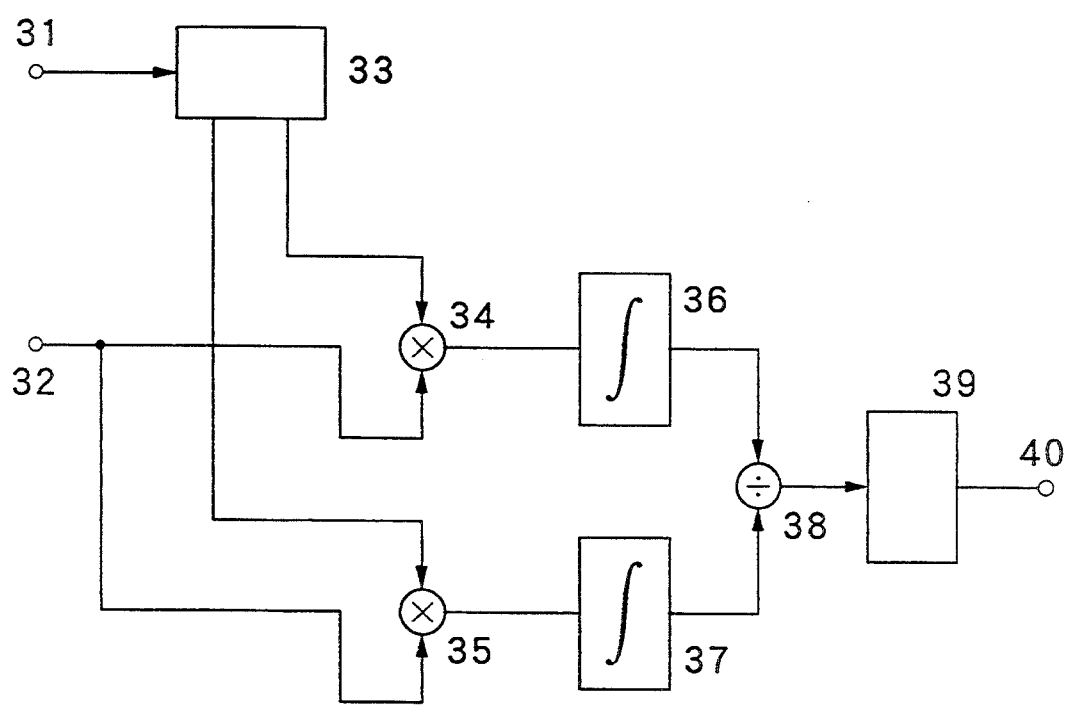
FIG. 3 is a block diagram showing one embodiment of a magnetization ratio detector for use in the magnetic reproduction circuit of the present invention.

FIG. 3 is a block diagram showing one embodiment of a magnetization ratio detector for use in the magnetic reproduction circuit of the present invention comprising a terminal 31 to which an output 26 of the magnetic transition point detector section shown in FIG. 2 is input, a terminal 32 to which an output of the delay element 20 shown in FIG. 1 is input, a sine-wave and cosine-wave generating circuit 33, multipliers 34 and 35, integrators 36 and 37, a divider 38, an arctangent calculator 39, and an output terminal 40. The sine-wave and cosine-wave generating circuit 33, multipliers 34 and 35, integrators 36 and 37, and divider 38 form an arithmetic circuit for finding the spectrum ratio of spectra perpendicular to each other of a reproduction signal.

The operation of the magnetization ratio detector is to be described by using a reproduction waveform model similar to that used to describe the conventional magnetic reproduction circuit.

When the equations (2) and (3) are Fourier-transformed by using a wavelength $\lambda$, there are obtained the equations (13) and (14):

$$Ef_x(\lambda) = E_o \cdot 2g\pi \exp(-2a\pi/\lambda) \cdot \sin(g \cdot \pi/\lambda) \cdot \lambda/2\pi \quad (13)$$

$$Ef_y(\lambda) = -E_o \cdot 2g\pi \exp(-2a\pi/\lambda) \cdot \sin(g \cdot \pi/\lambda) \cdot \lambda/2\pi \cdot j \quad (14)$$

The spectrum of a reproduction signal per unit magnetization in each of the longitudinal component and perpendicular component is constant throughout all the wavelengths. Therefore, in calculating the spectrum ratio it is sufficient to find spectra of a reproduction signal for a desired wavelength instead of finding the sum of spectra of the reproduction signal for all wavelengths.

As in the following equation (15), since the longitudinal component and perpendicular component of a reproduction waveform $e_o$ are an even function and an odd function, respectively, the reproduction waveform $e_o(x)$ is multiplied by a sine wave, $\sin(2\pi x/\lambda)$, and a cosine wave, $\cos(2\pi x/\lambda)$, of any wavelength individually, and then the products are integrated, so that the spectra perpendicular to each other are separated from each other. Calculating the arctangent value of the spectrum ratio of these spectra gives the value $\theta$.

$$\int_{-\infty}^{\infty} e_0(x) \cdot \cos(2\pi x/\lambda) dx \colon \int_{-\infty}^{\infty} e_0(x) \cdot \sin(2\pi x/\lambda) dx = \quad (15)$$

$$\int_{-\infty}^{\infty} e_x(x) \cdot \cos\theta \cdot \cos(2\pi x/\lambda)dx \cdot \int_{-\infty}^{\infty} e_y(x) \cdot \sin\theta \cdot$$

$$\sin(2\pi x/\lambda)dx = \cos\theta \cdot \sin\theta \quad (5)$$

Although the above description is made for the case where the magnetic transition point is 0, or x=0, for simplicity, a result of the detection by the magnetic transition point detector section shown in FIG. 2 is used since the magnetic transition point is generally unknown. Let the magnetic transition point be x=β, then by multiplying the reproduction waveform by a sine wave, $\sin(2\pi(x-\beta)/\lambda)$, and a wave, $\cos(2\pi(x-\beta)/\lambda)$, individually and integrating the products the longitudinal component and perpendicular component can be separated or extracted from each other, thus giving the value $\theta$ as in the above description.

Embodiment 4

Figure 4:
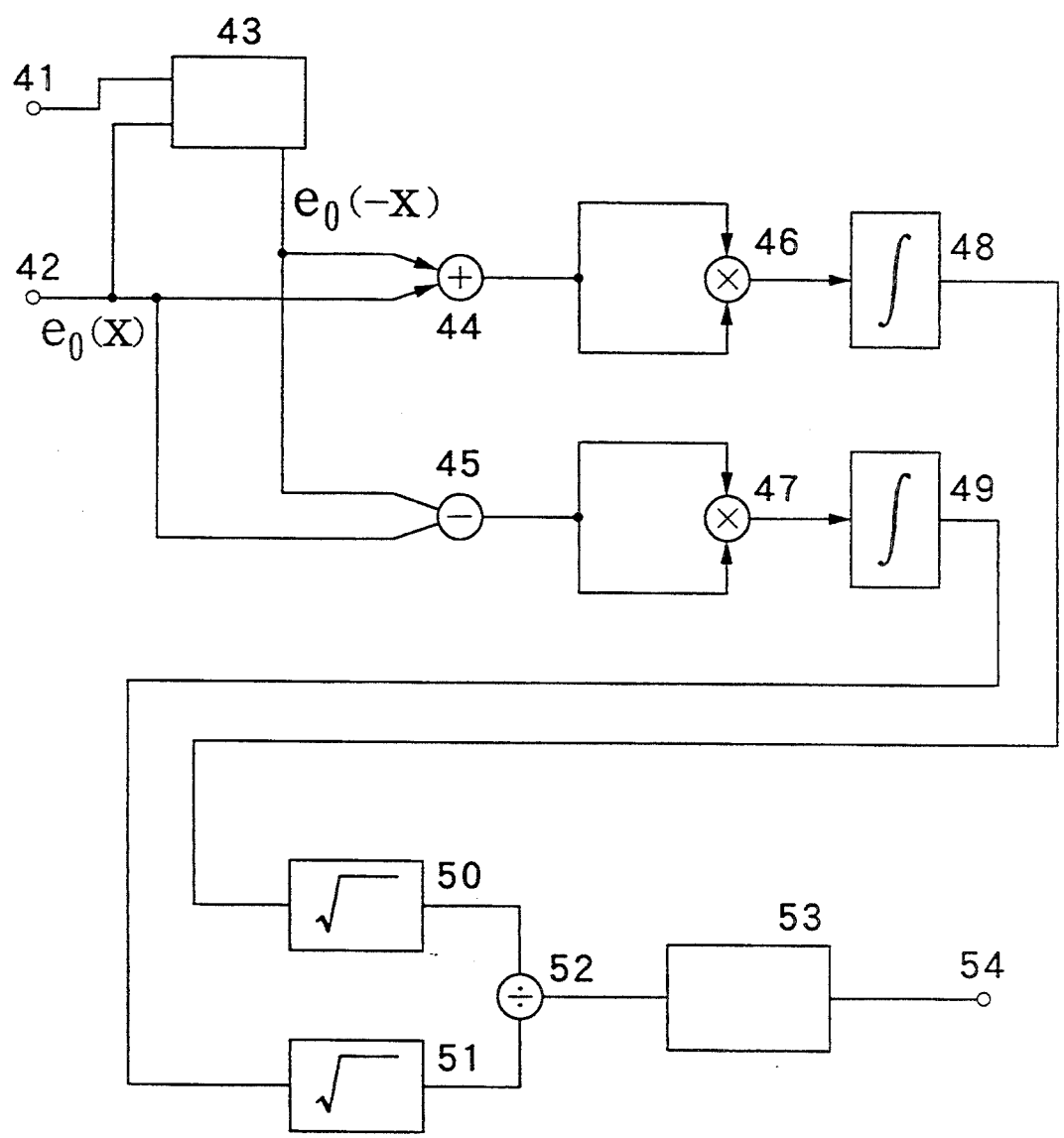
FIG. 4 is a block diagram showing another embodiment of the magnetization ratio detector for use in the magnetic reproduction circuit of the present invention.

FIG. 4 is a block diagram showing another embodiment of the magnetization ratio detector for use in the magnetic reproduction circuit of the present invention comprising a terminal 41 to which an output of the magnetic transition point detector section shown in FIG. 2 is input, a terminal 41 to which an output of the delay element 20 shown in FIG. 1 is input, a waveform inverse arithmetic circuit 43, an adder 44, a subtracter 45, square multipliers 46 and 47, integrators 48 and 49, square root calculators 50 and 51, a divider 52, an arc-tangent calculator 53, and an output terminal 54.

The operation of the magnetization ratio detector is to be described by using a reproduction waveform model similar to that used to describe the conventional magnetic reproduction circuit.

As described for the equations (13) and (14), the spectrum of a reproduction signal per unit magnetization in each of the longitudinal component and perpendicular component is equal throughout all the wavelength zones. Therefore, the square number of the spectrum, or the electric power spectrum, is equal throughout all the wavelength zones, as in the equation (16):

$$Ef_x^2(\lambda) = Ef_y^2(\lambda) \quad (16)$$

Therefore, if Parseval's theorem is used, the following equations (17) and (18) are deduced and, hence the integrated values of the square numbers of respective components of the reproduction waveform are also equal to each other as in the following equation (19).

$$\int_{-\infty}^{\infty} Ef_x^2(\lambda)d\lambda = \int_{-\infty}^{\infty} e_x^2(x)dx \quad (17)$$

$$\int_{-\infty}^{\infty} Ef_y^2(\lambda)d\lambda = \int_{-\infty}^{\infty} e_y^2(x)dx \quad (18)$$

$$\int_{-\infty}^{\infty} e_x^2(x)dx = \int_{-\infty}^{\infty} e_y^2(x)dx \quad (19)$$

This embodiment is adapted to find the ratio of the longitudinal component to the perpendicular component by the use of the above relationship. In the reproduction waveform $e_0(x)$ of the equation (1), $e_x(x)$ and $e_y(x)$ are an even function and an odd function, respectively and, hence, the longitudinal component and the perpendicular component can be separated from each other. Let the longitudinal component and the perpendicular component be $P_x(x)$ and $P_y(x)$, respectively, then the following equations (20) and (21) can be obtained.

$$P_x(x) = \{e_0(x) + e_0(-x)\}/2 = e_x(x) \cdot \cos\theta \quad (20)$$

$$P_y(x) = \{e_0(x) - e_0(-x)\}/2 = e_y(x) \cdot \sin\theta \quad (21)$$

If the equation (19) is used, then $$\int P_x(x)^2 dx : \int P_y(x)^2 dx = \cos^2\theta : \sin^2\theta \quad (22)$$

Accordingly, the value $\theta$ is found as:

$$\theta = \tan^{-1}(\int P_y(x)^2 dx / \int P_x(x)^2 dx)^{\frac{1}{2}} \quad (23)$$

Although the above description is made for the case where the magnetic transition point is 0, or x=0, for simplicity, a result of the detection by the magnetic transition point detector section shown in FIG. 2 is used since the magnetic transition point is generally unknown. Let the magnetic transition point be x=β, and the longitudinal component $P_x(x)$ and the perpendicular component $P_y(x)$, respectively, be represented by the following equations (24) and (25), then the longitudinal component $P_x(x)$ and the perpendicular component $P_y(x)$ can be separated from each other, thus giving the parameter $\theta$.

$$P_x(x) = \{e_0(x) + e_0(2\beta - x)\}/2 \quad (24)$$

$$P_y(x) = \{e_0(x) - e_0(2\beta - x)\}/2 \quad (25)$$

The previous magnetization ratio detector described in Embodiment 3 finds spectra of a reproduction waveform by processing a signal in a wavelength zone or frequency zone with the use of Fourier expansion or the like. In contrast, the magnetization ratio detector in this embodiment finds spectra by processing a waveform in time series on a space (or a metric) axis or time axis.

The Hilbert transform filter 12 can be formed of a delay element and is represented by the following approximation (26):

$$e_h(x) = \int \frac{e_0(x-u)}{\pi u} du \quad (26)$$

$$= \Sigma \frac{e_0(x - nT)}{\pi nT}$$

$$= -\frac{e_0(x + mT)}{\pi mT} - \ldots - \frac{e_0(x + 2T)}{\pi 2T} -$$

$$\frac{e_0(x + T)}{\pi T} + \frac{e_0(x - T)}{\pi T} + \frac{e_0(x - 2T)}{\pi 2T} + \ldots +$$

$$\frac{e_0(x - mT)}{\pi mT}$$

A negative delay element is non-existent practically and, hence, calculation as in the following formula (27) is performed with a further delay of mT.

$$e_h(x) = -\frac{e_0(x)}{\pi mT} - \ldots - \frac{e_0(x + (m-2)T)}{\pi 2T} - \quad (27)$$

-continued
$$\frac{e_0(x + (m-1)T)}{\pi T} + \frac{e_0(x + (m-1)T)}{\pi T} +$$

$$\frac{e_0(x - (m+2)T)}{\pi 2T} + \ldots + \frac{e_0(x - 2mT)}{\pi mT}$$

Figure 5:
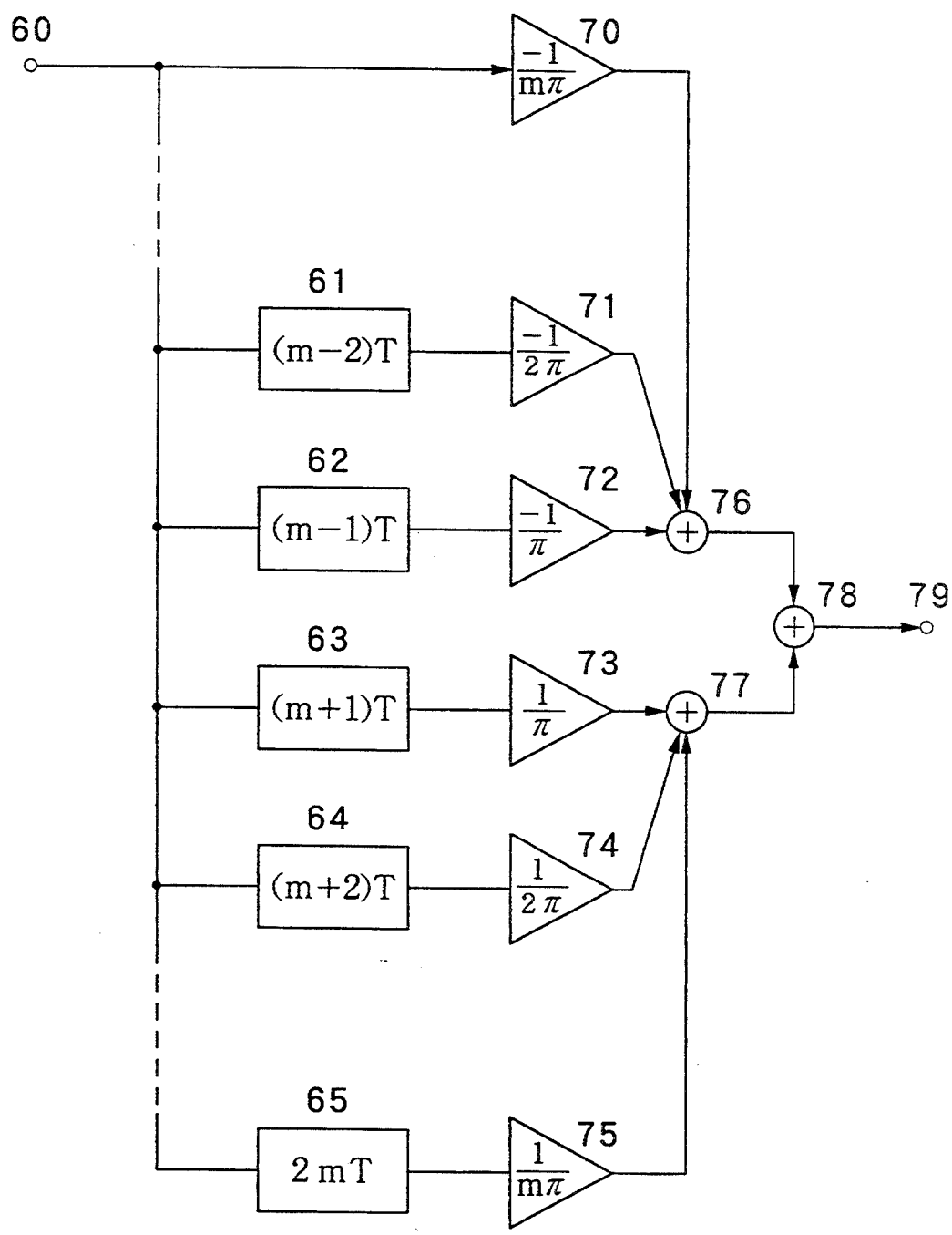
FIG. 5 is a block diagram showing an example of a Hilbert transform filter for use in the embodiment of the magnetic reproduction circuit of the present invention.

FIG. 5 is a circuit diagram showing a specific example of the Hilbert transform filter 12 which performs Hilbert transform on the basis of the formula (27). This filter comprises an input terminal 60, delay elements 61 to 65 with respective delays of (m−2)T, (m−1)T, (m+1)T, (m+2)T ... and 2mT, arithmetic amplifiers 70 to 75 with respective amplification factors of −1/(mπ), ... −1/(2π), −1/π, 1/π, 1/(2π), ... and 1/(mπ), adders 76 to 78, and an output terminal 79.

Figure 6:
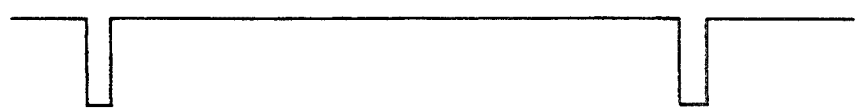
FIG. 6a–b are examples of a time chart of a recording/reproduction signal generated by the present invention.
Figure 6:
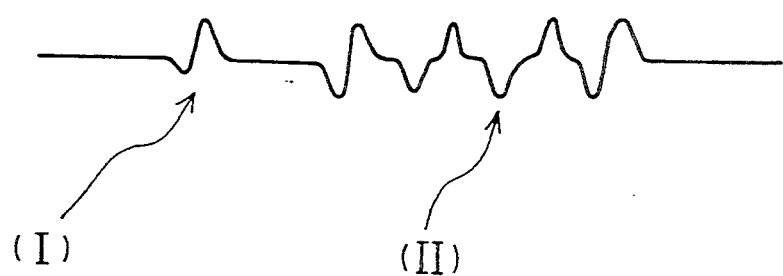
Figure 7:
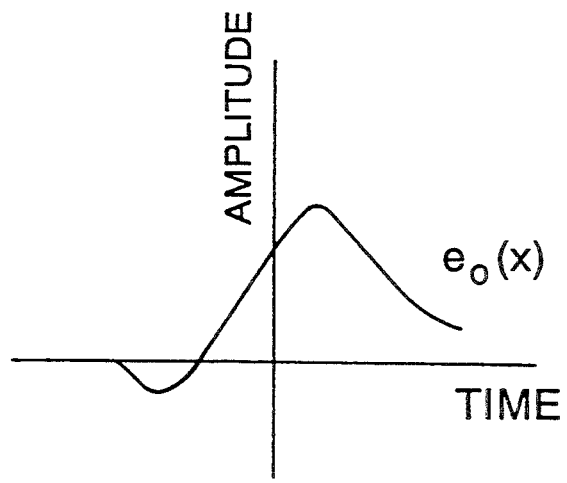
FIG. 7a–c are time charts showing respective signal waveforms of longitudinal component and perpendicular component of a reproduction signal.
Figure 7:
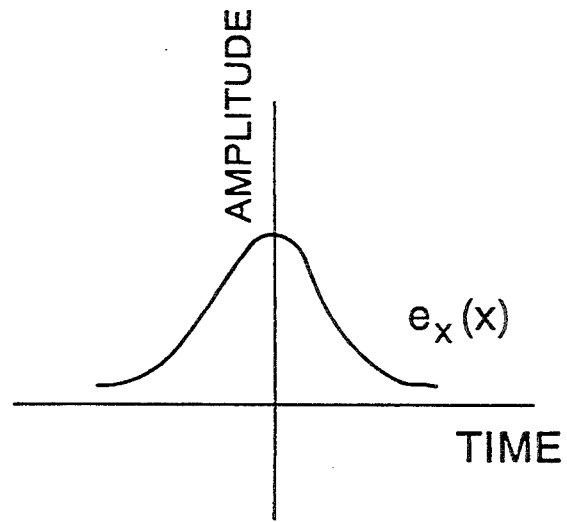
Figure 7:
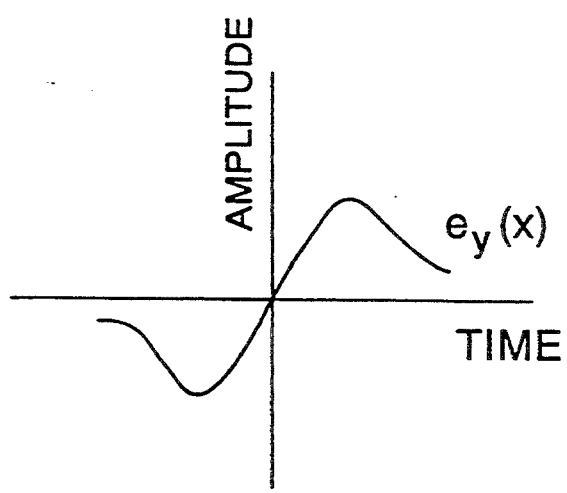

FIG. 6 is an example of a time chart of a recording-/reproduction signal in the present invention; in which FIG. 6(a) shows a detecting signal representing a physical position (or point) on the medium and obtained by an optical sensor, magnetic sensor or the like, and FIG. 6(b) shows a reproduction signal wherein numeral (I) denotes a signal zone for finding a magnetization ratio, and numeral (II) denotes a data zone.

In the present embodiment a detection point detectable by an optical sensor, magnetic sensor or the like is provided on the medium, using the detection point as a reference a magnetization ratio is found, the amplification factor of the amplifier of the reproduction circuit is optimized, and then a data signal is recorded or reproduced in the data zone.

The amplifier 16 of the embodiment shown in FIG. 1 is provided for correction of not only a waveform but also an amplication factor and is not necessarily needed when only a waveform is to be corrected.

It is noted that although no description is made on a filter for reducing noise or a like component, such a component may be inserted into the circuit as required.

Further, although the description is made on the case where an asymmetrical waveform in which the longitudinal component and the perpendicular are superposed upon each other is replaced with a reproduction waveform equivalent to the longitudinal component, the asymmetrical waveform may be replaced with a reproduction waveform equivalent to the perpendicular component which is odd functional about the magnetic transition point by substituting the amplification factor, −tanθ, of the amplifier 14 with cotθ and the amplification factor, cosθ, of the amplifier 16 with sinθ as in the following equation (28):

$$e_c(x) = \{e_d(x) + \cot\theta \cdot e_H(x)\}\sin\theta = e_x(x) \tag{28}$$

According to the present invention, as has been described above in a magnetic reproduction circuit including a Hilbert transform filter and a delay element, to both of which is input a signal reproduced from a recording/reproduction medium, a variable amplifier connected to an output terminal of at least one of the Hilbert transform filter and the delay element, and an adder for adding an output of the Hilbert transform filter to that of the delay element, at least one of the two outputs being varied in amplitude by the variable amplifier, a magnetic transition point (or position) detector and a residual magnetization ratio detector are provided to vary the amplification factor of the amplifier using the magnetization ratio as a variable. Hence, the magnetic reproduction circuit of the present invention is able to obtain a symmetrical waveform reproduced from a longitudinal component of even an asymmetrical waveform having an inconstant ratio of the longitudinal component to the perpendicular component, thereby facilitating the signal processing in a reproduction system.

While only certain presently preferred embodiments have been described in detail, as will be apparent with those familiar with the art, certain changes and modifications can be made without departing from the spirit and scope of the invention.

What is claimed is:

1. A magnetic reproduction circuit comprising:
    a Hilbert transform filter and a delay element each adapted to receive a signal reproduced from a magnetic recording medium;
    a variable amplifier connected to an output terminal of at least one of the Hilbert transform filter and the delay element;
    an adder for adding outputs, from the Hilbert transform filter and the delay element wherein the outputs are fed to the adder with or without passing through the variable amplifier for varying their amplitude;
    a detector for detecting a magnetic transition point of the magnetic recording medium; and
    a magnetization ratio detector for finding a ratio of a magnetization of the magnetic recording medium in the moving direction to a magnetization of the magnetic recording medium in a direction perpendicular to the moving direction,
    wherein an amplification factor of the variable amplifier is varied by using the magnetization ratio found by the magnetization detector as a parameter.

2. The magnetic reproduction circuit of claim 1, wherein said detector further comprises:
    two square multipliers connected to output terminals of the Hilbert transform filter and the delay element, respectively; and
    an adder connected to output terminals of the two square multipliers.

3. A magnetization ratio detector, comprising an arithmetic circuit for finding a ratio of spectra perpendicular to each other of a reproduction signal existing in any interval with a magnetic transition point as its center, and an arctangent arithmetic circuit for finding an arctangent value of the ratio.

4. A magnetization ratio detector comprising a waveform inverse arithmetic circuit for inverting a reproduction signal with respect to a magnetic transition point, an adder for finding a sum of the reproduction signal inverted and the original reproduction signal, a subtracter for finding a difference between the reproduction signal inverted and the original reproduction signal, square multipliers respectively connected to output terminals of the adder and the subtracter, integrators respectively connected to output terminals of the two square multipliers, square root calculators respectively connected to output terminals of the two integrators, a divider for finding an output ratio of one of the two square root calculators to the other, and an arctangent calculator for finding an arctangent value of the ratio found by the divider.

5. The magnetic reproduction circuit of claim 1, wherein said magnetization ratio detector further comprises:
    a waveform inverse arithmetic circuit for inverting a reproduction signal with respect to a magnetic transition point, an adder for finding a sum of the reproduction signal inverted and the original reproduction signal, a subtracter for finding a difference between the reproduction signal inverted and the original reproduction signal, square multipliers respectively connected to output terminals of the adder and the subtracter, integrators respectively connected to output terminals of the two square multipliers, square root calculators respectively connected to output terminals of the two integrators, a divider for finding an output ratio of one of the two square root calculators to the other, and an arctangent calculator for finding an arctangent value of the ratio found by the divider.

6. The magnetic reproduction circuit of claim 1, wherein said detector further comprises an arithmetic circuit for finding a ratio of spectra perpendicular to each other of a reproduction signal existing in any interval with a magnetic transition point as its center, and an arctangent arithmetic circuit for finding an arctangent value of the ratio, 7. A magnetic reproduction circuit comprising:

a Hilbert transform filter and a delay element each receiving a signal input;

a variable gain amplifier connected to an output terminal of said delay element;

an adder for adding outputs from the Hilbert transform filter and the variable gain amplifier;

a detector for detecting a magnetic transition point of a magnetic recording medium from which said input signal was reproduced; and a magnetization ratio detector which receives said detected magnetic transition point and determines a ratio of a longitudinal magnetization of said magnetic recording medium to a perpendicular magnetization of said magnetic recording medium, wherein a gain of said variable gain amplifier is varied based upon said magnetization ratio.

8. The magnetic reproduction circuit of claim 7, wherein said detector further comprises: two square multipliers connected to output terminals of the Hilbert transform filter and the delay element, respectively; and an adder connected to output terminals of the two square multipliers.

9. The magnetic reproduction circuit of claim 7, wherein said magnetization ratio detector further comprises:

a waveform inverse arithmetic circuit for inverting a reproduction signal with respect to a magnetic transition point, an adder for finding a sum of the reproduction signal inverted and the original reproduction signal, a subtracter for finding a difference between the reproduction signal inverted and the original reproduction signal, square multipliers respectively connected to output terminals of the adder and the subtracter, integrators respectively connected to output terminals of the two square multipliers, square root calculators respectively connected to output terminals of the two integrators, a divider for finding an output ratio of one of the two square root calculators to the other, and an arctangent calculator for finding an arctangent value of the ratio found by the divider.

10. The magnetic reproduction circuit of claim 7, wherein said detector further comprises an arithmetic circuit for finding a ratio of spectra perpendicular to each other of a reproduction signal existing in any interval with a magnetic transition point as its center, and an artangent arithmetic circuit for finding an arctangent value of the ratio.

11. The magnetic reproduction circuit of claim 7, wherein said detector is connected, at its input side, to outputs from said Hilbert transform filter and said delay element.

* * * * *